Dec. 31, 1946.  F. E. BECKER  2,413,402
PIPE COUPLER INTERLOCK
Filed March 18, 1946
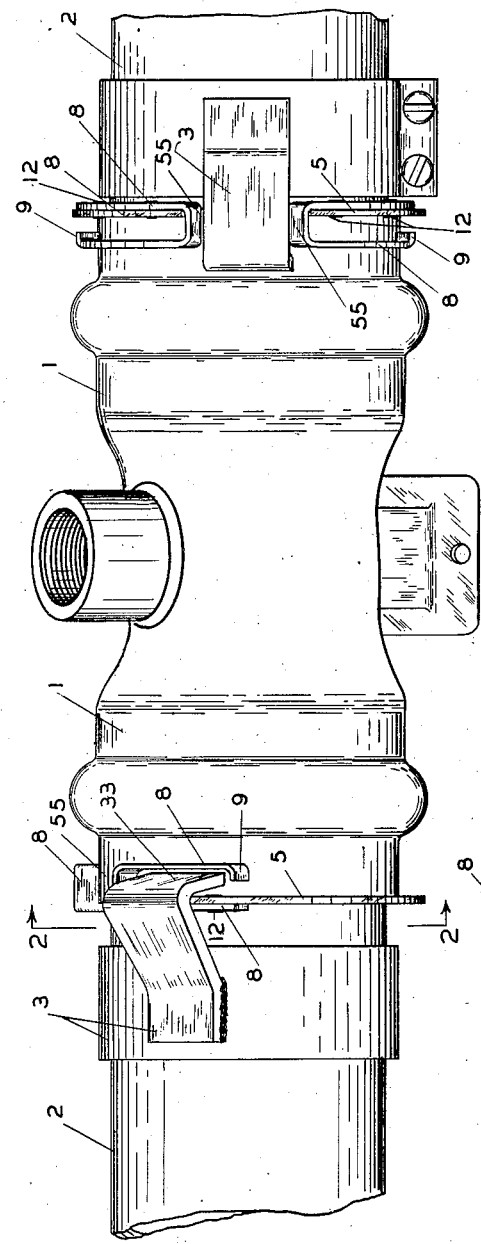
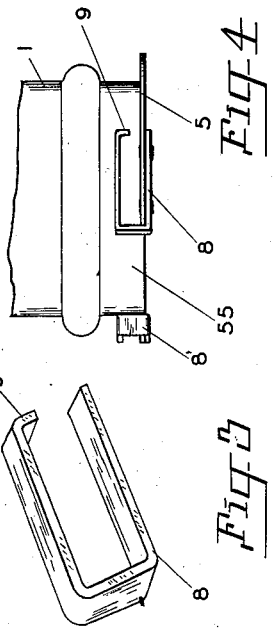
*INVENTOR.*
FREDERICK E. BECKER
BY
ATTORNEY Patented Dec. 31, 1946

2,413,402

UNITED STATES PATENT OFFICE 2,413,402

PIPE COUPLER INTERLOCK

Frederick E. Becker, Portland, Oreg.

Application March 18, 1946, Serial No. 655,248

4 Claims. (Cl. 285—175)

This invention relates to an interlock for a pipe coupling as used in sprinkler type irrigation pipe, which always consists of bell and spigot lightweight steel pipe couplers butt welded onto lengths of suitable pipe. The sprinkler pipe couplings usually but not always include a sprinkler head outlet and the bell end always contains a self-sealing cup packing into which is pushed a plain end in laying the pipes, which must always be done by one man as two on the job makes it too expensive, and each pipe joint must include an easily engaged and disengageable locking device that can be handled from the middle of the length of pipe, and will "stay put," which is the problem towards which this invention is directed and which has not been adequately solved up to now, unless by the present invention, which is believed to be the case.

When long strings of pipes are thus coupled together, it will be necessary to twist some to get the sprinkler outlets on top; likewise, because of pulsations due to pumping and for unknown causes, the joint locks tend to move around to the place where they were locked together, and unlock. If this happens in the middle of a long line a lot of work and adjusting is necessary to reestablish the status quo.

The object of the present invention, therefore, is a locking means for a push-together coupler, that is easily locked and unlocked by a man manipulating the pipe from its center area but which is not susceptible to accidental unlocking. The reason it is not susceptible to unlocking is that the locking means being locked, cannot be unlocked while the pipe is under pressure, accidentally or purposely, and in use there is no tendency for the pipe to move without pressure.

A drawing accompanies and forms a part of this specification, in which—

Fig. 1 is a side view of a standard double end pipe coupling to which is applied a locking device now in use in very large numbers and to which has been applied the interlock of the present invention;

Fig. 2 is a slightly reduced section taken on the line 2—2 of Fig. 1, with the old lock omitted but including the interlock of the invention;

Fig. 3 is a perspective of the interlock separated from the coupling; and

Fig. 4 is a reduced fragmentary plan view of a coupling of the kind chosen to illustrate the interlock, with two interlocks in place.

Describing the drawing in greater detail: Numeral 1 represents a push type coupler for pipes that is in use by the hundreds of thousands, and numeral 2 represents plain end pipes that have been pushed into the coupler 1 and sealed by cup packing; 3 represents a locking device, also old, that is sometimes spot welded onto the plain end pipes 2, and other times made as a separate clamp on structure as shown in the drawing. Both kinds are well known.

In rolling the coupler 1, a flange is rolled upstanding as at 5, and to lock with the hook portion of 3, as 33, a short gap 55, is cut in the flange 5. To use, the plain end 2 is pushed into the coupler 1, turned if necessary so that the hook 33 will pass through the gap 55, and turned in either direction; but as pointed out it gives a lot of trouble. The interlocks, of which there must be one protecting each end of the gap 55, as shown in the figures are fastened one at each terminus of the gap and are preferably formed as a flat metal link 8 with one open end save that the open end is preferably provided with a short rebent portion tab 9. These interlocks are preferably spot welded to the upstanding portion of the flange 5 at the two boundary limits of the gap 55.

In Fig. 1, at the end nearest the top of the sheet, the hook 3 is shown just as it has been pushed through the gap 55 at that end. The next motion will be to twist the plain end, thus carrying the hook 33 part way around the pipe; then it can be pulled back and into the interlock as shown at the bottom end of Fig. 1. Left alone it is certain to find its way into the interlock, sooner or later. Being in, it can turn in one direction, that would be clockwise, in which case it is certain to be engaged by the other interlock at the other boundary of the gap. In the views the spot welds that fasten the interlock are variously shown, indicating that other means may be substituted. The fastenings are indicated by the numeral 12. By reversing the operation of locking described supra, the workman, who must handle the pipe from its median length, can unlock it with as much facility as if the interlocks were not present, because there is then no internal pressure tending to separate the pipes from the couplers.

Having fully described my invention so that it can take its place in the irrigation, piping and related fields, what I claim as new and desire to secure by Letters Patent is:

1. An interlock for guarding a flange gap and hook pipe lock against working apart comprising, an open end link member made rigid with the flange at each end of the gap, the open end furthest from the gap, said link wide enough to contain the hook when it is rotated past the interlock and reversely rotated into it.

2. An interlock for guarding a flange gap and hook pipe lock against accidental separation comprising an open end link of rectangular material made rigid with the flange at each end of the gap with the open ends thereof opening away from the gap, the said link wider than the engaging end of the hook and adapted to contain said hook upon moving towards the gap from either direction when there is internal pressure therein.

3. The combination as claimed in claim 1 in which the open ends of the links are restricted with a short rebent tab that partially closes the open end of each link.

4. The combination as claimed in claim 2 in which the open ends of the links are restricted by a short rebent tab that partially closes the open ends of the links.

FREDERICK E. BECKER.